US012803917B2

(12) United States Patent
Lei

(10) Patent No.: US 12,803,917 B2
(45) Date of Patent: Nov. 17, 2026

(54) DATA TRANSMISSION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/930,464

(22) Filed: Oct. 29, 2024

(65) Prior Publication Data

US 2025/0055802 A1 Feb. 13, 2025

Related U.S. Application Data

(63) Continuation of application No. PCT/CN2023/092637, filed on May 8, 2023.

(30) Foreign Application Priority Data

Sep. 28, 2022 (CN) ......................... 202211192945.9

(51) Int. Cl.
*H04L 47/2416* (2022.01)
*H04L 43/087* (2022.01)
*H04L 47/2425* (2022.01)

(52) U.S. Cl.
CPC ........ *H04L 47/2416* (2013.01); *H04L 43/087* (2013.01); *H04L 47/2425* (2013.01)

(58) Field of Classification Search
CPC ............. H04L 47/2416; H04L 47/2425; H04L 47/801; H04L 47/56; H04L 43/087;
(Continued)

(56) References Cited

U.S. PATENT DOCUMENTS

2006/0072543 A1* 4/2006 Lloyd ..................... H04L 47/24
370/351
2006/0143496 A1 6/2006 Silverman
(Continued)

FOREIGN PATENT DOCUMENTS

CN 112825510 A 5/2021
CN 113498099 A 10/2021
WO WO 2022093938 A1 5/2022

OTHER PUBLICATIONS

Tencent Technology, ISR, PCT/CN2023/092637, Jul. 14, 2023, 2 pgs.
China Mobile, "KI #3A, New Solution: Mechanism for AF Requesting 5G Network Jitter", SA WG2 Meeting #139E, Document: S2-2003777, Jun. 2020, 5 pgs.
(Continued)

*Primary Examiner* — Azizul Choudhury
(74) *Attorney, Agent, or Firm* — Morgan, Lewis & Bockius LLP

(57) ABSTRACT

This application provides a data transmission method computer-readable storage medium performed by an electronic device. The method includes: obtaining a latency variation distribution characteristic of a service data packet, the latency variation distribution characteristic being configured for indicating a transmission latency range of the service data packet; detecting a network transmission characteristic between an application server (AS) and a core network gateway; adjusting the latency variation distribution characteristic of the service data packet based on the network transmission characteristic, to obtain an adjusted latency variation distribution characteristic; and transmitting the adjusted latency variation distribution characteristic to a core network element, so that the core network element controls data transmission based on the adjusted latency variation distribution characteristic.

15 Claims, 6 Drawing Sheets

(58) Field of Classification Search
CPC . H04L 43/0852; H04L 43/08; H04L 41/5009; H04L 41/5019; H04L 41/0823; H04W 72/11; H04W 76/28; H04W 88/14
See application file for complete search history.

(56) References Cited

U.S. PATENT DOCUMENTS

| | | | | |
|---|---|---|---|---|
| 2008/0123661 | A1* | 5/2008 | Steets ................. | H04L 41/5003 370/395.21 |
| 2014/0177436 | A1* | 6/2014 | Korus ................... | H04W 76/40 370/312 |
| 2017/0243560 | A1 | 8/2017 | Donelli et al. | |
| 2021/0250787 | A1* | 8/2021 | Kolding ................ | H04L 47/283 |
| 2021/0314807 | A1 | 10/2021 | Li et al. | |
| 2022/0303804 | A1 | 9/2022 | Ha et al. | |

OTHER PUBLICATIONS

Tencent Technology, Japanese Office Action, JP Patent Application No. 2024-563452, Sep. 29, 2025, 8 pgs.
Tencent Technology, WO+IPRP, PCT/CN2023/092637, Mar. 1, 2025, 4 pgs.
Tencent Technology, Extended European Search Report, EP Patent Application No. 23869617.3, Aug. 11, 2025, 15 pgs.
3GPP.org., 3rd Generation Partnership Project; Technical Specification Group Services and System Aspects; Study on XR (Extended Reality) and Media Services (Release 18), 3GPP TR 23.700-60 V0.4.1, Technical Report, Aug. 2022, 260 pgs.

* cited by examiner

DATA TRANSMISSION METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2023/092637, entitled "DATA TRANSMISSION METHOD AND APPARATUS, COMPUTER-READABLE MEDIUM, AND ELECTRONIC DEVICE" filed on May 8, 2023, which claims priority to Chinese Patent Application No. 202211192945.9, entitled "DATA TRANSMISSION METHOD AND APPARATUS, COMPUTER-READABLE MEDIUM, AND ELECTRONIC DEVICE" filed with the China National Intellectual Property Administration on Sep. 28, 2022, both of which are incorporated herein by reference in their entirety.

This application relates to U.S. patent application Ser. No.18/930,523, entitled "DATA TRANSMISSION CONTROL METHOD AND APPARATUS, COMPUTER-READABLE MEDIUM, AND ELECTRONIC DEVICE" filed on Oct. 29, 2024, which is incorporated herein by reference in its entirety.

FIELD OF THE TECHNOLOGY

This application relates to the field of computers and communication technologies, and in particular, to a data transmission method and apparatus, a computer-readable storage medium, and an electronic device.

BACKGROUND OF THE DISCLOSURE

In a $5^{th}$-generation (5G) system (5GS) and an evolved 5GS, high bandwidth interactive services such as cloud gaming, virtual reality (VR), augmented reality (AR), mixed reality (MR), extended reality (XR), and cinematic reality (CR) are of significance.

These high bandwidth interactive services not only require a short transmission time limit, but also bring a large network transmission load as a result of improvement of indicators such as a resolution and a frame rate and a significant increase in an amount of data generated by an application layer. Moreover, these services heavily rely on transmission performance of a network, an actual effect of which may be affected by even a minor change in the network. Therefore, how to ensure transmission quality of a service data packet is a technical problem that needs to be resolved urgently.

SUMMARY

Embodiments of this application provide a data transmission method and apparatus, a computer-readable storage medium, and an electronic device, which may take impact of a network transmission characteristic between an application server (AS) and a core network gateway on a latency variation distribution characteristic of a service data packet into consideration, thereby improving accuracy of scheduling transmission of the service data packet and quality of transmitting the service data packet.

Other features and advantages of this application become apparent through the following detailed descriptions, or partly learned through practice of this application.

According to a first aspect, an embodiment of this application provides a data transmission method performed by an electronic device, and the method includes: obtaining a latency variation distribution characteristic of a service data packet, the latency variation distribution characteristic being configured for indicating a transmission latency range of the service data packet; detecting a network transmission characteristic between an AS and a core network gateway; adjusting the latency variation distribution characteristic of the service data packet based on the network transmission characteristic, to obtain an adjusted latency variation distribution characteristic; and transmitting the adjusted latency variation distribution characteristic to a core network element, so that the core network element controls data transmission based on the adjusted latency variation distribution characteristic.

According to a second aspect, an embodiment of this application provides a data transmission method performed by an electronic device, and the method includes: receiving an adjusted latency variation distribution characteristic for a service data packet transmitted by an application function (AF) entity, the adjusted latency variation distribution characteristic being obtained by the AF entity by adjusting a latency variation distribution characteristic of the service data packet based on a network transmission characteristic between an AS and a core network gateway; obtaining a network transmission characteristic between the core network gateway and an access network element; readjusting the latency variation distribution characteristic transmitted by the AF entity based on the network transmission characteristic between the core network gateway and the access network element; and controlling data transmission of the access network element based on a readjusted latency variation distribution characteristic.

According to a third aspect, an embodiment of this application provides a non-transitory computer-readable storage medium, having a computer program stored therein, the computer program, when executed by a processor of an electronic device, causing the electronic device to implement the data transmission method described in the above embodiments.

According to a fourth aspect, an embodiment of this application provides an electronic device, including: one or more processors; and a memory, configured to store one or more computer programs, the one or more computer programs, when executed by the one or more processors, causing the electronic device to implement the data transmission method in the above embodiments.

According to a fifth aspect, an embodiment of this application provides a computer program product, including a computer program, the computer program being stored in a computer-readable storage medium, a processor of an electronic device reading the computer program from the computer-readable storage medium and executing the computer program to cause the electronic device to perform the data transmission method provided in the above embodiments.

The above general descriptions and the following detailed descriptions are merely exemplary and illustrative, and cannot limit this application.

DESCRIPTION OF EMBODIMENTS

Figure 1:
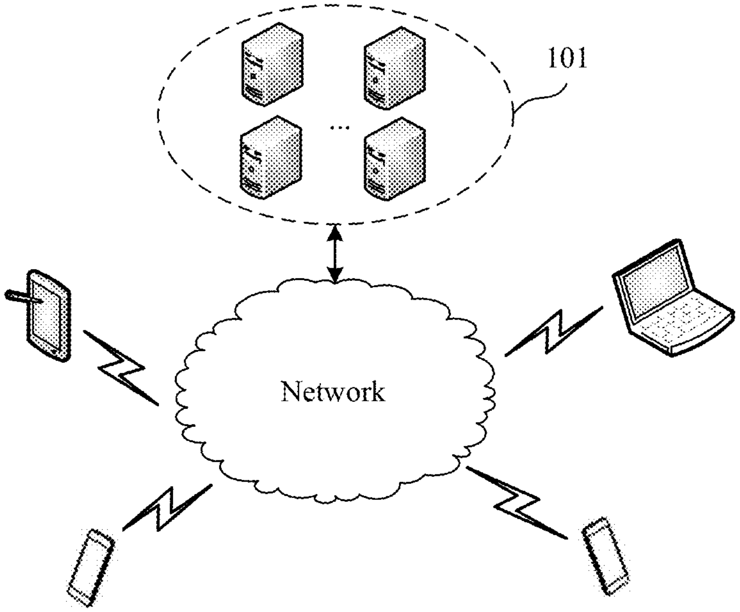
FIG. 1 is a schematic diagram of an exemplary system architecture to which technical solutions of embodiments of this application are applicable.

Exemplary implementations are described more comprehensively with reference to drawings. However, the exemplary implementations may be implemented in various forms and are not to be understood as being limited to the examples. Rather, these implementations are provided to make this application more comprehensive and complete, and comprehensively convey the concept of the exemplary implementations to a person skilled in the art.

In addition, features, structures, or characteristics described in this application may be combined in one or more embodiments in any proper manner. In the following descriptions, many specific details are provided to comprehensively understand the embodiments of this application. However, a person skilled in the art is to be aware that, during implementation of the technical solutions in this application, not all detailed features in the embodiments need to be used, one or more specific details may be omitted, or another method, unit, apparatus, operation, or the like may be used.

Block diagrams shown in the drawings are merely functional entities, and do not necessarily correspond to physically independent entities. In other words, the functional entities may be implemented in a form of software, or in one or more hardware modules or integrated circuits, or in different networks and/or processor apparatuses and/or microcontroller apparatuses.

Flowcharts shown in the drawings are merely exemplary descriptions, and neither necessarily need to include all content and operations, nor necessarily need to be performed in a described order. For example, some operations may be further divided, while some operations may be combined or partially combined. Therefore, an actual execution order may be changed according to an actual case.

"A plurality of" in the description means two or more. "And/or" describes an association relationship between associated objects, and indicates that three relationships may exist. For example, A and/or B may represent that only A exists, both A and B exist, and only B exists. The character "/" generally indicates an "or" relationship between the associated objects.

As the $5^{th}$-Generation (5G) mobile communication technology develops, many multimedia services that require a large data amount and a short latency are widely used. For example, interactive service such as cloud gaming services, virtual reality (VR), augmented reality (AR), mixed reality (MR), extended reality (XR), and cinematic reality (CR) are used.

For example, in a cloud gaming scenario shown in FIG. 1, a cloud server 101 is configured to run a cloud game. The cloud server 101 may render a game picture, encode an audio signal and a rendered image, and transmit encoded data to game clients through a network. The game client may be a user equipment (UE) with a basic streaming media playback capability, a human-computer interaction capability, a communication capability, and the like, such as a smartphone, a tablet computer, a notebook computer, a desktop computer, a smart television, smart home, an on-board terminal, or an aircraft. Alternatively, the game client may be an application running in a terminal device. Specifically, the game client may decode the encoded data transmitted by the cloud server 101 to obtain an analog audio/video signal, and play the analog audio/video signal.

FIG. 1 merely shows an exemplary system architecture representing a cloud gaming system, and does not limit a specific architecture of the cloud gaming system. For example, in other embodiments, the cloud gaming system may further include a backend server configured for scheduling and the like. In addition, the cloud server 101 may be an independent physical server, or may be a server cluster formed by a plurality of physical servers or a distributed system, or may be a cloud server providing basic cloud computing services such as a cloud service, a cloud database, cloud computing, a cloud function, cloud storage, a network service, cloud communication, a middleware service, a domain name service, a security service, a content delivery network (CDN), a big data platform, and an artificial intelligence (AI) platform. The game client and the cloud server 101 may be directly or indirectly connected through wired or wireless communication, which is not limited in this application.

Figure 2:
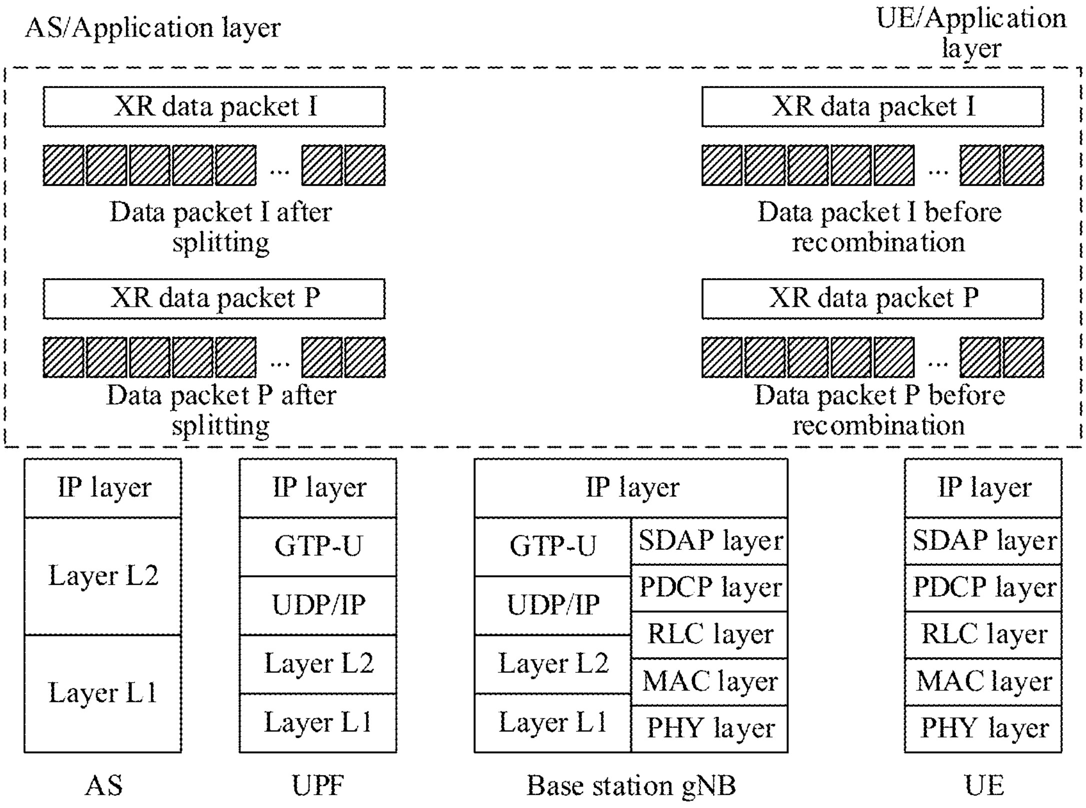
FIG. 2 is a schematic diagram of a transmission process of a multimedia data packet according to an embodiment of this application.

In the above multimedia-based interaction service application scenarios, a multimedia data packet needs to be split into a plurality of data packets for transmission due to a large size. Specifically, as shown in FIG. 2, in a 5G system (5GS), a user plane mainly includes an application server (AS), a user plane function (UPF), a base station (a next generation nodeB, gNB), and a UE. Most multimedia data packets are transmitted in a downlink direction in some typical service scenarios. For example, the multimedia data packets are transmitted from the AS to the UPF, and then to the UE through the gNB. During transmission, a multimedia data packet (an XR data packet is used as an example in FIG. 2) is split at an application layer of the AS, and after split packets arrive at the UPF from the AS as Internet protocol (IP) packets, the 5GS transmits data sub-packets to a UE side through a protocol data unit (PDU) session, and the data sub-packets are gradually transmitted from a protocol stack to upper layers at the UE side and recombined to recover the multimedia data packet.

In a system shown in FIG. 2, a layer L1 is a physical layer, which is configured to ensure that original data may be transmitted on various physical media. A layer L2 is a data link layer, which is configured to provide services to a network layer based on services provided by the physical layer. An IP layer is a network layer, which is configured to achieve data transmission between two end systems. UDP is a user datagram protocol in Chinese. GTP-U is a general packet radio service (GPRS) tunneling protocol user plane in Chinese. PHY is an abbreviation of physical, which refers to a physical layer in Chinese. MAC is media access control in Chinese. RLC is radio link control in Chinese. PDCP is a packet data convergence protocol in Chinese. SDAP is a service data adaptation protocol in Chinese.

As described above, for a multimedia service, such as an XR and media (XRM) service, a frame of multimedia data packet is split into a plurality of data packets for transmission. A data packet formed by a single multimedia service frame or a group of packets (GoP) may have a relatively large number of bytes, which needs to be carried by a series of IP data packets. A specific correlation exists between the IP data packets. Processing the packets based on the correlation can effectively save wireless network bandwidth. Some XRM service flows have a periodicity, and may be, for example, 60 frames per second (FPS), 90 FPS, or 120 FPS data packets, and the resulting video frames generate data packets at a time interval of approximately 16.67 ms, 11.11 ms, or 8.33 ms. Through the periodic characteristic, time-frequency resource efficiency of a wireless network can be improved. For example, a semi-persistent scheduling (SPS) mechanism or a connected-discontinuous reception (C-DRX) mechanism may be adopted based on the periodicity of an XRM service, provided that the 5GS has learned that the XRM service flow has the periodicity.

In an embodiment, an application function (AF)/AS may directly provide periodicity information and a latency variation distribution characteristic of a service flow to the 5GS. However, after a resolution of an XR service is increased, a video frame may be split into a plurality of IP data packets for transmission, and periodicities and latency variation distribution characteristics of the split IP data packets may be affected after the IP data packets are transmitted between a third-party AS and a 5GS gateway. Therefore, when the data packets arrive at a base station for scheduling and transmission over a wireless network, the periodicities and the latency variation distribution characteristics are changed, resulting in a deviation in C-DRX configuration on the base station side.

Figure 3:
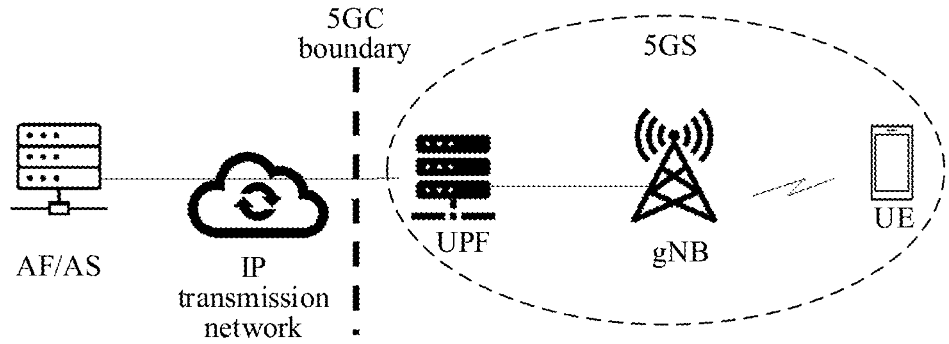
FIG. 3 is a schematic diagram of a system architecture of a data transmission method according to an embodiment of this application.

Specifically, as shown in FIG. 3, the AF/AS can implement a control plane function of a third-party AS, and perform interaction in a manner of AF-network exposure function (NEF)-policy control function (PCF) or AF-PCF. The AF/AS entity can further implement a user plane function of the third-party AS, i.e., in a manner of AS-IP transmission network-UPF interface. FIG. 3 shows a boundary of the 5GS, i.e., a deployment location of the 5GS gateway. The 5GS gateway may be a UPF entity, a control plane entity responsible for capability opening such as an NEF or a PCF, or a router/switch node or the like deployed between the 5GS and an external network.

In the embodiments of this application, the IP transmission network may be implemented in a wired or wireless manner. For example, the IP transmission network may be a metropolitan area network, an access network, or a wide area network based on an optical network, which depends on a topology relationship between a 5G core (5GC) boundary and the third-party AS. Since a 5G network adopts a network architecture that facilitates sinking of the UPF, if the AF/AS is located at an edge, the UPF sinks to the edge, which can reduce a topological distance between the 5GC boundary (i.e., the UPF at the edge position) and the AF/AS. However, the AF/AS may alternatively be located in a central cloud. In this case, sinking of the UPF cannot resolve the problem. Therefore, impact of the IP transmission network between the third-party AS and the 5GC boundary, i.e., the UPF, on service flow transmission cannot be ignored.

Figure 4:
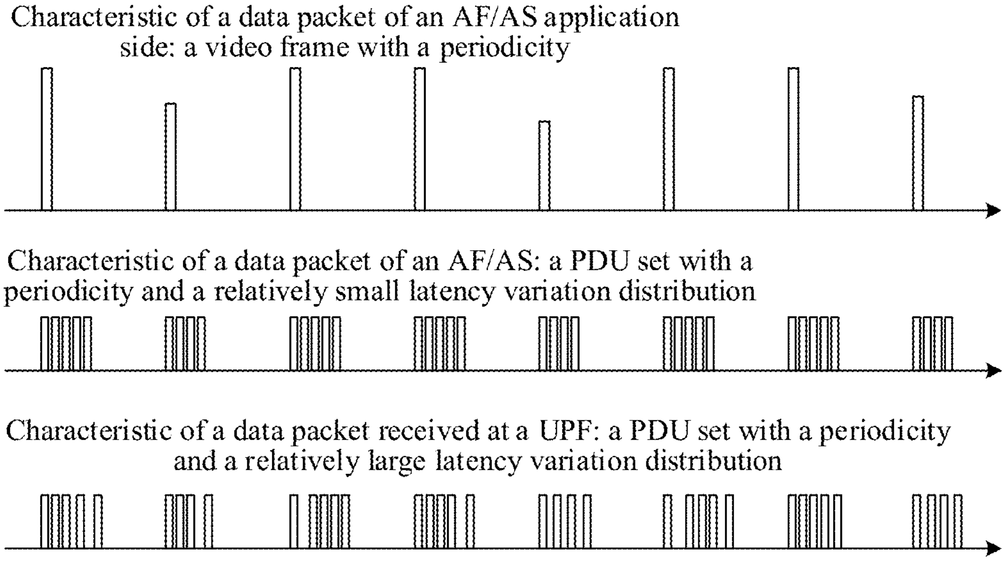
FIG. 4 is a schematic diagram of a comparison between latency variation distributions during transmission of a service data packet according to an embodiment of this application.

Specifically, as shown in FIG. 4, a characteristic of a data packet of an AF/AS application side, for example, may be a video frame with a periodicity. During transmission, the data packet is split into a plurality of IP data packets. The plurality of IP data packets may form a PDU set. In this case, a latency variation distribution of the IP data packets is relatively small. Since the IP data packets need to be transmitted between the third-party AS and the 5GS gateway, the latency variation distribution of the IP data packets increases when the IP data packets arrive at the UPF. As shown in FIG. 4, an increase in a latency between IP data packets in a PDU set results in an increase in a time for receiving the PDU set.

Therefore, in an embodiment of this application, the AF/AS may combine periodicity information and a latency variation distribution characteristic of a service data packet with a characteristic of the IP transmission network between the AF/AS and the UPF, to achieve adjustment of the periodicity information and the latency variation distribution characteristic of the service data packet, and then provide indication information that may be configured for indicating adjusted periodicity information and an adjusted latency variation distribution characteristic of the service data packet to the 5GS, so that a 5GS network element such as the UPF can process an XR data packet based on the adjusted periodicity information and the adjusted latency variation distribution characteristic, including but not limited to C-DRX configuration and SPS scheduling for a radio access network (RAN).

In some embodiments, during the adjustment of the periodicity information and the latency variation distribution characteristic of the service data packet, a rule of the impact of the characteristic of the IP transmission network between the AF/AS and the UPF on the periodicity and the latency variation distribution characteristic of the service data packet may be determined by using an AI method, thereby achieving the adjustment of the periodicity information and the latency variation distribution characteristic of the service data packet.

The AI involves a theory, a method, a technology, and an application system that use a digital computer or a machine controlled by the digital computer to simulate, extend, and expand human intelligence, sense an environment, obtain knowledge, and use the knowledge to obtain an optimal result. In other words, the AI is a comprehensive technology in computer science, which attempts to understand the essence of intelligence and produce a new intelligent machine that can react in a manner similar to human intelligence. The AI is to study the design principles and implementation methods of various intelligent machines, to enable the machines to have functions of sensing, reasoning, and decision-making.

The AI technology is a comprehensive discipline, and involves a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. The AI software technology mainly includes major directions such as a computer vision technology, a speech processing technology, a natural language processing technology, machine learning (ML)/deep learning, autonomous driving, and intelligent traffic.

In the embodiments of this application, the AF/AS may specifically determine a rule of impact of the characteristic of the IP transmission network between the AF/AS and the UPF on the periodicity and the latency variation distribution characteristic of the service data packet by using the ML method. The ML is an interdisciplinary field, involving a plurality of disciplines such as the theory of probability, statistics, the approximation theory, convex analysis, and the theory of algorithm complexity. The ML specializes in how a computer simulates or realizes learning behaviors of humans to obtain new knowledge or skills, and reorganizes existing knowledge structures to keep improving performance thereof. The ML is the core of the AI and a fundamental way to make computers intelligent, which is applied in all fields of the AI. The ML and the deep learning generally include technologies such as an artificial neural network, a confidence network, reinforcement learning, transfer learning, inductive learning, and learning from demonstration.

Implementation details of the technical solutions of the embodiments of this application are described below in detail.

Figure 5:
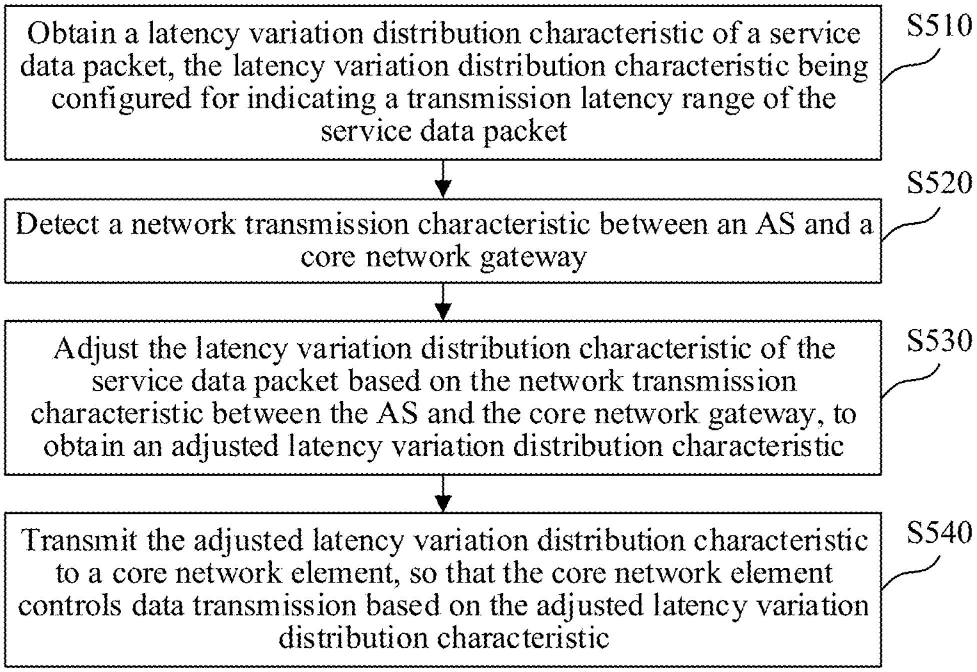
FIG. 5 is a flowchart of a data transmission method according to an embodiment of this application.

FIG. 5 is a flowchart of a data transmission method according to an embodiment of this application. The data transmission method may be performed by an electronic device shown in FIG. 11, or, may be performed by an AF entity. Referring to FIG. 5, the data transmission method may include S510 to S540, which are described in detail as follows:

Operation S510: Obtain a latency variation distribution characteristic of a service data packet, the latency variation distribution characteristic being configured for indicating a transmission latency range of the service data packet.

In some embodiments, the service data packet may be a periodic service data packet. Periodicity information of the periodic service data packet may be determined based on at least one of the following factors: an encoding/decoding manner of the service data packet, a multimedia service flow transmission parameter corresponding to the service data packet, a push parameter of an AS for a multimedia service flow, and a pull parameter of the AS for the multimedia service flow.

The encoding/decoding manner of the service data packet may be, for example, one of advanced video coding (AVC), high efficiency video coding (HEVC), versatile video coding (VVC), and the like. During specific implementation, the periodicity information of the service data packet may be determined based on the encoding/decoding manner of the service data packet.

The multimedia service flow transmission parameter corresponding to the service data packet may include service data content included in the service data packet, for example, one or more of audio, a video, haptic information, and the like. During specific implementation, the periodicity information of the service data packet may be determined based on the service data content (for example, periodic audio information) included in the service data packet.

The push parameter of the AS for the multimedia service flow may be a push frame rate (such as a fixed frame rate or a variable frame rate). The pull parameter of the AS for the multimedia service flow may be a pull frame rate (which may be a fixed frame rate or a variable frame rate).

In some embodiments, the latency variation distribution characteristic includes a maximum latency variation value and a minimum latency variation value. For example, the latency variation distribution characteristic may be a latency variation distribution range composed of the maximum latency variation value and the minimum latency variation value, or may be a plurality of discrete latency variation values including the maximum latency variation value and the minimum latency variation value.

In some embodiments, the AF may obtain a network transmission status of the service data packet obtained by the AS through statistics collection, and then determine the maximum latency variation value and the minimum latency variation value based on the network transmission status of the service data packet. The network transmission status of the service data packet obtained by the AS through statistics collection may be obtained from a network interface between the AS and a transmission network.

Operation S520: Detect a network transmission characteristic between an AS and a core network gateway.

The core network gateway is a boundary device of a core network, for example, may be a UPF.

In some embodiments, a process of detecting the network transmission characteristic between the AS and the core network gateway may include: dynamically detecting a transmission link between the AS and the core network gateway; and then determining a transmission bandwidth and a latency change of the transmission link based on a dynamic detection result of the transmission link. The transmission bandwidth and the latency change are the network transmission characteristic between the AS and the core network gateway.

In some embodiments, the process of detecting the network transmission characteristic between the AS and the core network gateway may be determining the network transmission characteristic between the AS and the core network gateway based on a service level agreement (SLA) between the AS and the core network. In the technical solution of this embodiment, the network transmission characteristic between the AS and the core network gateway may be directly determined based on the SLA when the SLA exists in the transmission link between the AF/AS and the core network.

In some embodiments, before the network transmission characteristic between the AS and the core network gateway is determined based on the SLA between the AS and the core network, it may be evaluated whether the SLA has impact on the latency variation distribution characteristic of the service data packet based on the SLA between the AS and the core network. If the SLA has impact on the latency variation distribution characteristic of the service data packet, the network transmission characteristic between the AS and the core network gateway is determined based on the SLA between the AS and the core network. If the SLA has no impact on the latency variation distribution characteristic of the service data packet, the transmission link between the AS and the core network gateway may be dynamically detected, and then the network transmission characteristic between the AS and the core network gateway may be determined based on the dynamic detection result of the transmission link.

In some embodiments, the process of detecting the network transmission characteristic between the AS and the core network gateway may be: dynamically detecting the transmission link between the AS and the core network gateway based on the SLA between the AS and the core network, to obtain the transmission bandwidth and the latency change of the transmission link. In this embodiment, although the SLA specifies a service level between the AS and the core network, an actual network status may be better than that specified by the SLA. In this case, the SLA may be used as a reference to achieve more targeted detection of the network transmission characteristic based on the SLA, thereby improving accuracy of detecting the network transmission characteristic.

Still refer to FIG. 5. Operation S530: Adjust the latency variation distribution characteristic of the service data packet based on the network transmission characteristic between the AS and the core network gateway, to obtain an adjusted latency variation distribution characteristic.

In some embodiments, a process of adjusting the latency variation distribution characteristic of the service data packet based on the network transmission characteristic in operation S530 may include: obtaining a rule of impact of the network transmission characteristic on the latency variation distribution characteristic of the service data packet; and then adjusting the latency variation distribution characteristic of the service data packet based on the impact rule. The impact rule may be a corresponding change rule (i.e., an impact rule) obtained by using an ML algorithm through continuous detection of impact of the network transmission characteristic between the AS and the core network gateway on the latency variation distribution characteristic.

In some embodiments, the adjusting the latency variation distribution characteristic of the service data packet based on the obtained impact rule may include at least one of: increasing a set value for a value of the latency variation distribution characteristic of the service data packet, increasing a set order of magnitude for the value of the latency variation distribution characteristic of the service data packet, and increasing a set multiple for the value of the latency variation distribution characteristic of the service data packet.

The increasing a set value for a value of the latency variation distribution characteristic of the service data packet may be adjusting a latency variation distribution characteristic of [−0.05, 0.05] to [−0.07, 0.07], i.e., increasing the latency variation distribution characteristic by 0.02. The increasing a set order of magnitude for the value of the latency variation distribution characteristic of the service data packet may be adjusting the latency variation distribution characteristic of [−0.05, 0.05] to [−0.5, 0.5], i.e., increasing the latency variation distribution characteristic by an order of magnitude. The increasing a set multiple for the value of the latency variation distribution characteristic of the service data packet may be adjusting the latency variation distribution characteristic of [−0.05, 0.05] to [−0.1, 0.1], i.e., increasing the latency variation distribution characteristic by 2 times.

Still refer to FIG. 5. Operation S540: Transmit the adjusted latency variation distribution characteristic to a core network element, so that the core network element controls data transmission based on the adjusted latency variation distribution characteristic.

In some embodiments, the core network element may transmit the adjusted latency variation distribution characteristic to an access network element (for example, a gNB), and then the access network element performs C-DRX configuration, SPS scheduling, and the like. The core network element may be a UPF, a PCF, or the like.

In the technical solution of the embodiment shown in FIG. 5, the impact of the network transmission characteristic between the AS and the core network gateway on the latency variation distribution characteristic of the service data packet may be taken into consideration, so that the adjusted latency variation distribution characteristic can adapt to an actual transmission process of the service data packet, which avoids a deviation in a configured data transmission control policy as a result of the impact of the network transmission characteristic, improves accuracy of scheduling the transmission of the service data packet and quality of transmitting the service data packet, and facilitates service experience.

In the technical solution of the embodiment shown in FIG. 5, the latency variation distribution characteristic of the service data packet is adjusted through the network transmission characteristic between the AS and the core network gateway. In other embodiments of this application, the periodicity information of the service data packet may change during the transmission of the service data packet as a result of the network transmission characteristic, a data packet transmission policy, or the like. In this case, the periodicity information of the service data packet may be adjusted based on the network transmission characteristic between the AS and the core network gateway, and then the adjusted periodicity information is transmitted to the core network element, so that the core network element controls data transmission based on the adjusted periodicity information.

In some embodiments of this application, the periodicity information and the latency variation distribution characteristic of the service data packet both may be adjusted based on the network transmission characteristic between the AS and the core network gateway, and then the adjusted periodicity information and the adjusted latency variation distribution characteristic may be transmitted to the core network element, so that the core network element controls the data transmission based on the adjusted periodicity information and the adjusted latency variation distribution characteristic.

Figure 6:
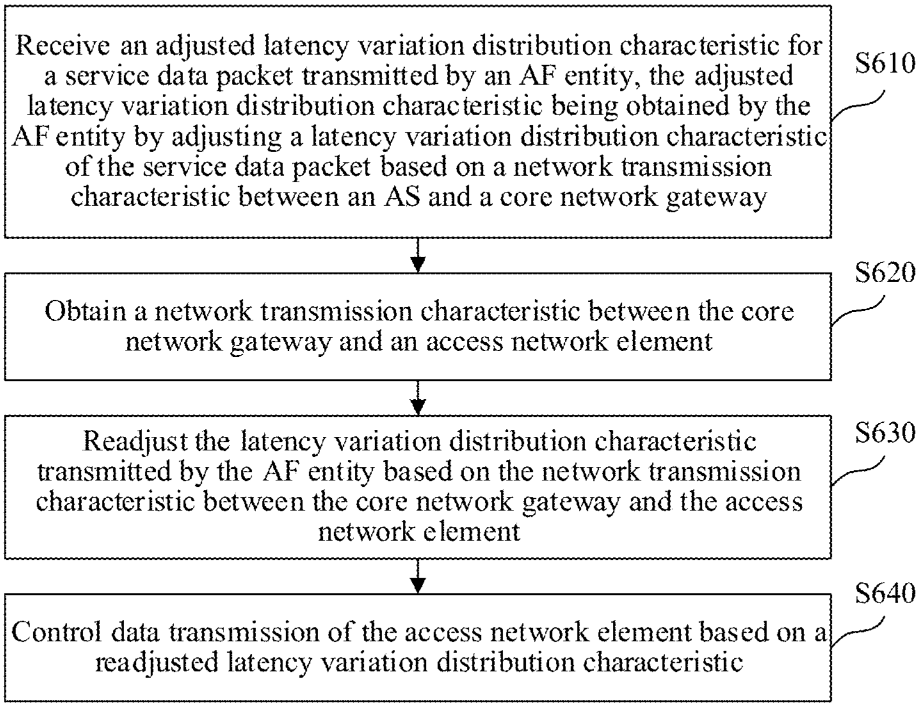
FIG. 6 is a flowchart of a data transmission method according to an embodiment of this application.

FIG. 6 is a flowchart of a data transmission method according to an embodiment of this application. The data transmission method may be performed by an electronic device shown in FIG. 11, or may be performed by a core network element. The core network element may be a PCF. Referring to FIG. 6, the data transmission method may include S610 to S640, which are described in detail as follows:

Operation S610: Receive an adjusted latency variation distribution characteristic for a service data packet transmitted by an AF entity, the adjusted latency variation distribution characteristic being obtained by the AF entity by adjusting a latency variation distribution characteristic of the service data packet based on a network transmission characteristic between an AS and a core network gateway.

In some embodiments, for a process in which the AF entity adjusts the latency variation distribution characteristic of the service data packet based on the network transmission characteristic between the AS and the core network gateway, reference may be made to the technical solutions in the above embodiments. Specifically, a rule of impact of a network transmission characteristic on the latency variation distribution characteristic of the service data packet is obtained, and then the latency variation distribution characteristic of the service data packet is adjusted based on the impact rule. For example, a set value for a value of the latency variation distribution characteristic of the service data packet may be increased, a set order of magnitude for the value of the latency variation distribution characteristic of the service data packet may be increased, or a set multiple for the value of the latency variation distribution characteristic of the service data packet may be increased.

The AF may directly transmit the adjusted latency variation distribution characteristic of the service data packet to the PCF. Alternatively, the AF may transmit the adjusted latency variation distribution characteristic of the service data packet to an NEF, and then the NEF forwards the adjusted latency variation distribution characteristic to the PCF.

Operation S620: Obtain a network transmission characteristic between the core network gateway and an access network element.

The core network gateway is a boundary device of a core network, for example, may be a UPF. The access network element may be a base station, for example, may be a gNB.

In some embodiments, the obtaining a network transmission characteristic between the core network gateway and an access network element may be detecting a network transmission characteristic of a GTP-U tunnel between the core network gateway and the access network element. Certainly, the obtaining a network transmission characteristic between the core network gateway and an access network element may alternatively include dynamically detecting a transmission link between the core network gateway and the access network element, and then determining the network transmission characteristic between the core network gateway and the access network element based on a dynamic detection result of the transmission link.

Operation S630: Readjust the latency variation distribution characteristic transmitted by the AF entity based on the network transmission characteristic between the core network gateway and the access network element.

In some embodiments, a process of readjusting the latency variation distribution characteristic transmitted by the AF entity based on the network transmission characteristic between the core network gateway and the access network element in operation S630 may include obtaining a rule of impact of the network transmission characteristic between the core network gateway and the access network element on the latency variation distribution characteristic of the service data packet, and then readjusting the latency variation distribution characteristic of the service data packet based on the impact rule. The impact rule may be a corresponding change rule (i.e., an impact rule) obtained by using an ML algorithm through continuous detection of impact of the network transmission characteristic between the core network gateway and the access network element on the latency variation distribution characteristic.

Operation S640: Control data transmission of the access network element based on a readjusted latency variation distribution characteristic.

In some embodiments, the core network element may transmit the readjusted latency variation distribution characteristic to the access network element (for example, the gNB), and then the access network element re-performs C-DRX configuration, SPS scheduling, and the like.

In the technical solution of the embodiment shown in FIG. 6, the impact of the network transmission characteristic between the core network gateway and the access network element on the latency variation distribution characteristic of the service data packet may be taken into consideration, so that the adjusted latency variation distribution characteristic can adapt to an actual transmission process of the service data packet, which avoids a deviation in a configured data transmission control policy as a result of the impact of the network transmission characteristic, improves accuracy of scheduling the transmission of the service data packet and quality of transmitting the service data packet, and facilitates service experience.

In the technical solution of the embodiment shown in FIG. 6, the latency variation distribution characteristic of the service data packet is adjusted through the network transmission characteristic between the core network gateway and the access network element. In other embodiments of this application, periodicity information of the service data packet may change during the transmission of the service data packet as a result of the network transmission characteristic, a data packet transmission policy, or the like. In this case, the periodicity information of the service data packet may be adjusted based on the network transmission characteristic between the core network gateway and the access network element, and then data transmission is controlled based on the adjusted periodicity information.

In some embodiments of this application, the periodicity information and the latency variation distribution characteristic of the service data packet both may be adjusted based on the network transmission characteristic between the core network gateway and the access network element, so that the core network element can control the data transmission based on the adjusted periodicity information and the adjusted latency variation distribution characteristic.

The technical solutions of the embodiments of this application are described above in terms of the AF entity and the core network element. Implementation details of the technical solutions of the embodiments of this application are further described below in terms of interaction among a plurality of device entities.

In the technical solutions of the embodiments of this application, the AF/AS may combine periodicity information and a latency variation distribution characteristic of a service data packet with a characteristic of an IP transmission network between the AF/AS and the UPF, to achieve adjustment of the periodicity information and the latency variation distribution characteristic of the service data packet, and then provide indication information that may be configured for indicating adjusted periodicity information and an adjusted latency variation distribution characteristic of the service data packet to the 5GS, so that a 5GS network element such as the UPF can process an XR data packet based on the adjusted periodicity information and the adjusted latency variation distribution characteristic, including but not limited to C-DRX configuration and SPS scheduling for a RAN.

In the embodiments of this application, a service data packet may be an XR service data packet, or may be another multimedia service data packet, for example, a data packet of a cloud gaming service, or a data packet of a service such as VR, AR, MR, or CR. In other words, the technical solutions of the embodiments of this application are applicable to processing of an XR service data packet, or is applicable to processing of a data packet of a service such as a cloud gaming service, VR, AR, MR, or CR.

Figure 7:
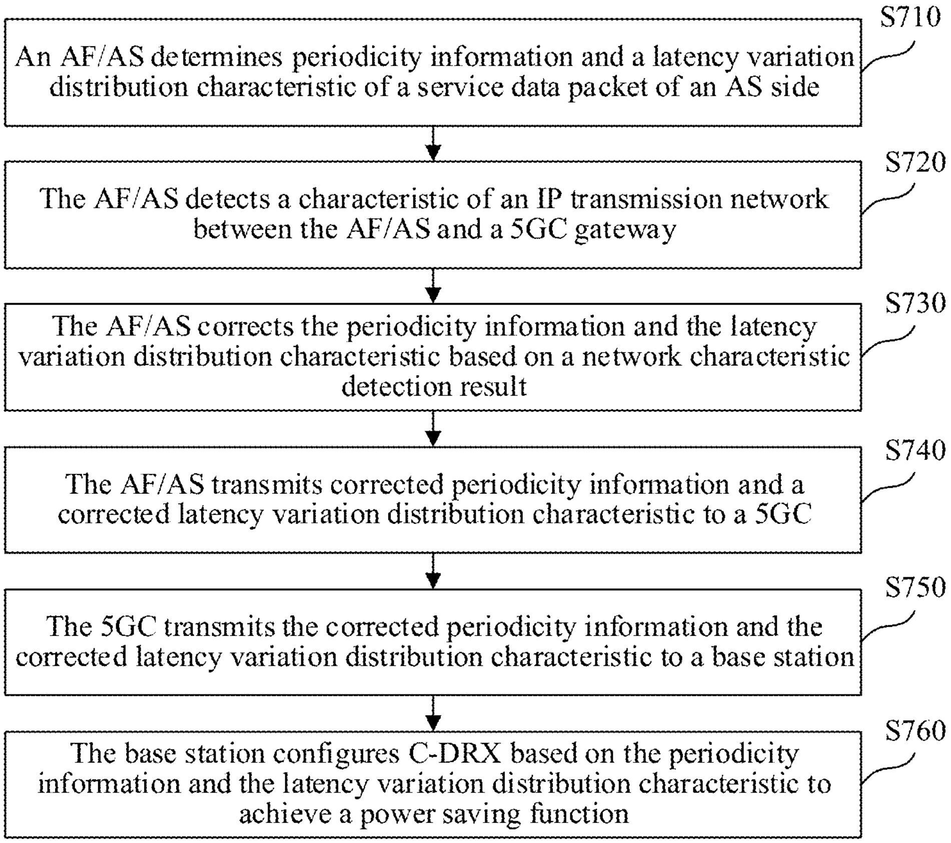
FIG. 7 is a flowchart of a data transmission method according to an embodiment of this application.

Specifically, as shown in FIG. 7, a data transmission method according to an embodiment of this application includes the following operations. The method may be performed by an electronic device shown in FIG. 11, or may be performed by an AF/AS. When the method is performed by the AF/AS, the method includes the following operations.

Operation S710: The AF/AS determines periodicity information and a latency variation distribution characteristic of a service data packet of an AS side.

In some embodiments, the AF/AS may determine the periodicity information of the service data packet based on an encoding/decoding manner of the service data packet and a transmission parameter of a multimedia service flow. The encoding/decoding manner of the service data packet includes but is not limited to AVC, HEVC, and VVC. The transmission parameter of the multimedia service flow may include service data content, which includes but is not limited to audio, a video, or haptic information.

In some embodiments, whether the service data packet has the periodicity information is related to a flow push parameter and a flow pull parameter the AS side, for example, whether the AS pushes a multimedia data flow at a fixed frame rate or a variable frame rate when a network bandwidth changes.

In some embodiments, the latency variation distribution characteristic, for example, may be represented as a jitter range. The jitter range may be a latency variation distribution range composed of a maximum latency variation value (i.e., a maximum jitter value) and a minimum latency variation value (i.e., a minimum jitter value).

For example, a jitter range of [−4, 4] indicates that −4 is the minimum latency variation value and 4 is the maximum latency variation value in a case that an average latency of 0 is used as a benchmark. In this case, if the average latency is 20 ms, an actual latency distribution is in a range of [16 ms, 24 ms].

In some embodiments, the maximum latency variation value and the minimum latency variation value may be obtained by the AS through statistics collection of network transmission of the multimedia data flow, i.e., may be obtained from an interface between the AS and the IP transmission network.

Operation S720: The AF/AS detects a characteristic of an IP transmission network between the AF/AS and a 5GC gateway.

In this embodiment of this application, since a quality of service (QOS) mechanism within a 5GS may be supported through a GTP-U tunnel and a radio bearer, but a link between the AF and the 5GS usually cannot be guaranteed by using the 5G QoS mechanism defined in the 3GPP, bandwidth and latency changes of the link may be obtained through dynamic link detection between the 5GS and the AF, thereby obtaining the characteristic of the IP transmission network.

If the link between the AF/AS and the 5GS has an SLA, the AF/AS may detect whether the SLA is satisfied, and may calculate, based on the SLA, a periodicity and a jitter distribution range transmitted by the AF/AS to the 5GS. In addition, changes in the periodicity and the jitter distribution range as a result of a real-time transmission indicator being better than an SLA requirement need to be taken into consideration.

Operation S730: The AF/AS corrects the periodicity information and the latency variation distribution characteristic based on a network characteristic detection result.

In some embodiments, that the AF/AS corrects the periodicity information and the latency variation distribution characteristic based on a network characteristic detection result may include obtaining a rule of impact of a network transmission characteristic on the latency variation distribution characteristic of the service data packet based on the network characteristic detection result, and then adjusting the periodicity information and the latency variation distribution characteristic of the service data packet based on the impact rule. The impact rule may be a corresponding change rule (i.e., an impact rule) obtained by using an ML algorithm through continuous detection of impact of the network transmission characteristic between the AS and the 5GC gateway on the latency variation distribution characteristic.

Operation S740: The AF/AS transmits corrected periodicity information and a corrected latency variation distribution characteristic to a 5GC network element.

In some embodiments, the AF/AS transmits the corrected periodicity information and the corrected latency variation distribution characteristic to the 5GC network element, or may indicate that these parameters are parameters corrected in consideration of the transmission link characteristic between AF/AS and the 5GS.

Operation S750: The 5GC network element transmits the corrected periodicity information and the corrected latency variation distribution characteristic to a base station.

In some embodiments, after receiving the corrected periodicity information and the corrected latency variation distribution characteristic, the 5GC network element may further correct the latency variation distribution characteristic based on a link characteristic between a UPF and a gNB. For example, a rule of impact of a network transmission characteristic between the UPF and the gNB on the latency variation distribution characteristic of the service data packet may be obtained and then the latency variation distribution characteristic of the service data packet is readjusted based on the impact rule. The impact rule may be a corresponding change rule (i.e., an impact rule) obtained by using an ML algorithm through continuous detection of impact of the network transmission characteristic between the UPF and the gNB on the latency variation distribution characteristic.

Operation S760: The base station configures C-DRX based on the periodicity information and the latency variation distribution characteristic to achieve a power saving function.

In this embodiment of this application, the C-DRX is a discontinuous reception mode in a connected state, in which case a UE is allowed to periodically enter a sleep state without detecting a physical downlink control channel (PDCCH), and the UE is woken up from the sleep state when detection is needed, thereby achieving power saving.

Figure 8:
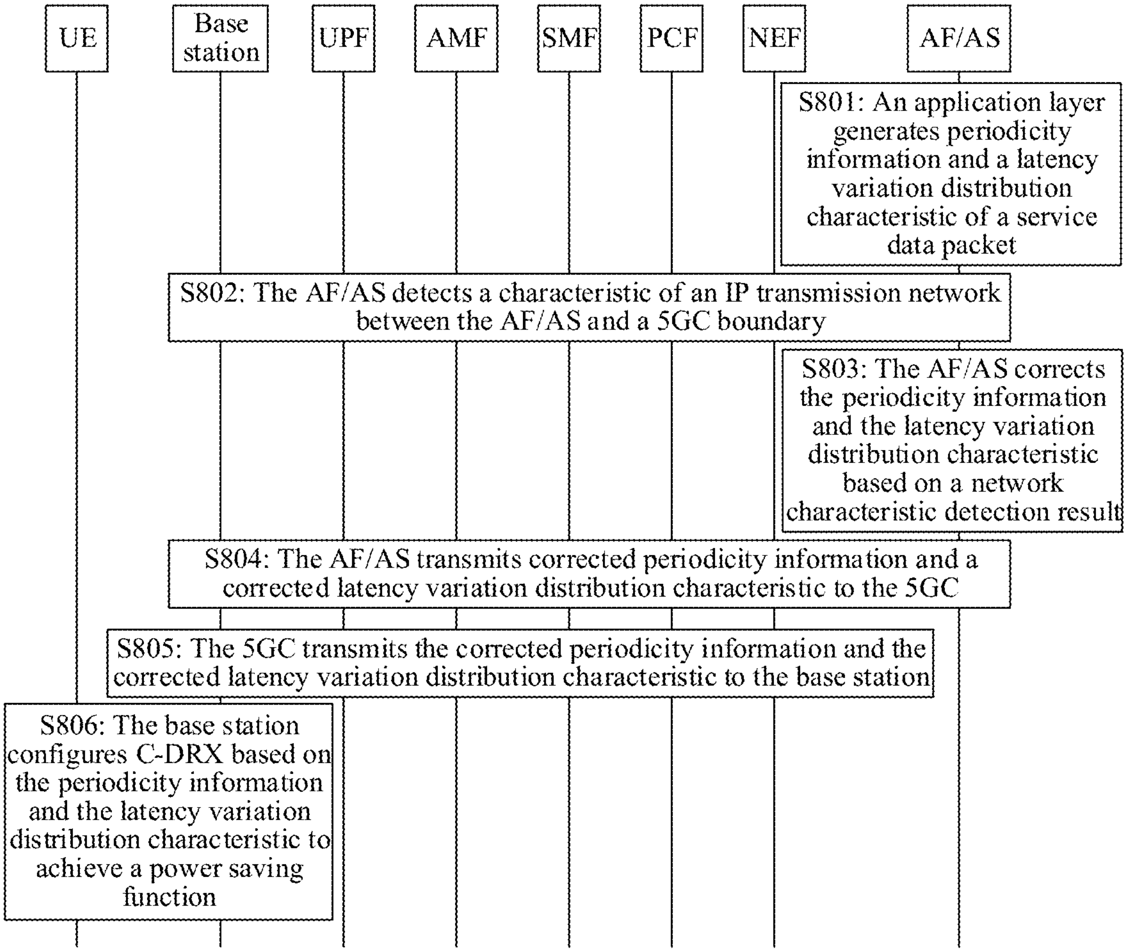
FIG. 8 is an interaction flowchart of a data transmission method according to an embodiment of this application.

The specific interaction process of the method shown in FIG. 7 is shown in FIG. 8, and includes the following operations:

S801: An application layer generates periodicity information and a latency variation distribution characteristic of a service data packet.

In some embodiments, the AF/AS may determine the periodicity information of the service data packet based on an encoding/decoding manner of the service data packet and a transmission parameter of a multimedia service flow. The encoding/decoding manner of the service data packet includes but is not limited to AVC, HEVC, and VVC. The transmission parameter of the multimedia service flow may include service data content, which includes but is not limited to audio, a video, or haptic information.

In some embodiments, whether the service data packet has the periodicity information is related to a flow push parameter and a flow pull parameter the AS side, for example, whether the AS pushes a multimedia data flow at a fixed frame rate or a variable frame rate when a network bandwidth changes.

In some embodiments, the latency variation distribution characteristic, for example, may be represented as a jitter range. The jitter range may be a latency variation distribution range composed of a maximum latency variation value (i.e., a maximum jitter value) and a minimum latency variation value (i.e., a minimum jitter value). The maximum latency variation value and the minimum latency variation value may be obtained by the AS through statistics collection of network transmission of the multimedia data flow, i.e., may be obtained from an interface between the AS and the IP transmission network.

S802: The AF/AS detects a characteristic of an IP transmission network between the AF/AS and a 5GC boundary.

In this embodiment of this application, since a QoS mechanism within a 5GS may be supported through a GTP-U tunnel and a radio bearer, but a link between the AF and the 5GS usually cannot be guaranteed by using the 5G QOS mechanism defined in the 3GPP, bandwidth and latency changes of the link may be obtained through dynamic link detection between the 5GS and the AF, thereby obtaining the characteristic of the IP transmission network.

S803: The AF/AS corrects the periodicity information and the latency variation distribution characteristic based on a network characteristic detection result.

In some embodiments, that the AF/AS corrects the periodicity information and the latency variation distribution characteristic based on a network characteristic detection result may include obtaining a rule of impact of a network transmission characteristic on the latency variation distribution characteristic of the service data packet based on the network characteristic detection result, and then adjusting the periodicity information and the latency variation distribution characteristic of the service data packet based on the impact rule. The impact rule may be a corresponding change rule obtained by using an ML algorithm through continuous detection of impact of the network transmission characteristic between the AS and the 5GC gateway on the latency variation distribution characteristic.

S804: The AF/AS transmits corrected periodicity information and a corrected latency variation distribution characteristic to the 5GC.

In some embodiments, the AF/AS transmits the corrected periodicity information and the corrected latency variation distribution characteristic to the 5GC network element, or may indicate that these parameters are parameters corrected in consideration of the transmission link characteristic between AF/AS and the 5GS.

S805: The 5GC transmits the corrected periodicity information and the corrected latency variation distribution characteristic to the base station.

In some embodiments, after receiving the corrected periodicity information and the corrected latency variation distribution characteristic, the 5GC network element may further correct the latency variation distribution characteristic based on a link characteristic between a UPF and a gNB.

S806: The base station configures C-DRX based on the periodicity information and the latency variation distribution characteristic to achieve a power saving function.

In the embodiments shown in FIG. 7 and FIG. 8, the technical solutions of the embodiments of this application are described through the correction of the periodicity information and latency variation distribution characteristic based on the network characteristic detection results by AF/AS. In other embodiments of this application, the AF/AS may correct the latency variation distribution characteristics based on the network characteristic detection result, and transmit the periodicity information to the gNB as known information, but correct the periodicity information as required. For example, the AF/AS corrects the periodicity information when the periodicity information of the service data packet is significantly affected by a network.

In the technical solutions in the above embodiments of this application, the impact of the network transmission characteristic between the AS and the core network gateway on the latency variation distribution characteristic of the service data packet may be taken into consideration, so that the adjusted latency variation distribution characteristic can adapt to an actual transmission process of the service data packet, which avoids a deviation in a configured data transmission control policy as a result of the impact of the network transmission characteristic, improves accuracy of scheduling the transmission of the service data packet and quality of transmitting the service data packet, and facilitates service experience.

Apparatus embodiments of this application are described below, which may be configured for performing the data transmission methods in the above embodiments of this application. For details not disclosed in the apparatus embodiments of this application, reference is made to the data transmission methods in the above embodiments of this application.

Figure 9:
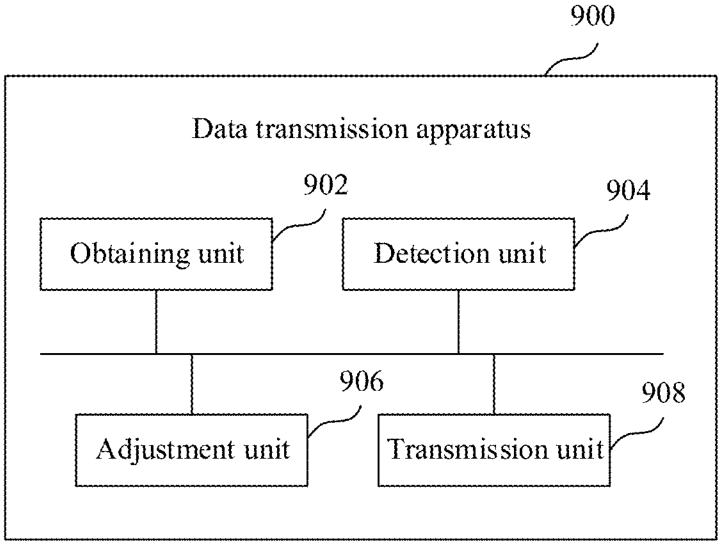
FIG. 9 is a block diagram of a data transmission apparatus according to an embodiment of this application.

FIG. 9 is a block diagram of a data transmission apparatus according to an embodiment of this application. The data transmission apparatus may be arranged in an AF entity.

Referring to FIG. 9, a data transmission apparatus 900 according to an embodiment of this application includes an obtaining unit 902, a detection unit 904, an adjustment unit 906, and a transmission unit 908.

The obtaining unit 902 is configured to obtain a latency variation distribution characteristic of a service data packet, the latency variation distribution characteristic being configured for indicating a transmission latency range of the service data packet. The detection unit 904 is configured to detect a network transmission characteristic between an AS and a core network gateway. The adjustment unit 906 is configured to adjust the latency variation distribution characteristic of the service data packet based on the network transmission characteristic, to obtain an adjusted latency variation distribution characteristic. The transmission unit 908 is configured to transmit the adjusted latency variation distribution characteristic to a core network element, so that the core network element controls data transmission based on the adjusted latency variation distribution characteristic.

In some embodiments of this application, based on the above solution, the service data packet is a periodic service data packet. The data transmission apparatus 900 further includes a determination unit, configured to determine periodicity information of the periodic service data packet based on at least one of the following factors: an encoding/decoding manner of the service data packet, a multimedia service flow transmission parameter corresponding to the service data packet, a push parameter of the AS for a multimedia service flow, and a pull parameter of the AS for the multimedia service flow.

In some embodiments of this application, based on the above solution, the latency variation distribution characteristic includes a maximum latency variation value and a minimum latency variation value. The obtaining unit 902 is configured to: obtain a network transmission status of the service data packet obtained by the AS through statistics collection; and determine the maximum latency variation value and the minimum latency variation value based on the network transmission status of the service data packet.

In some embodiments of this application, based on the above solution, the detection unit 904 is configured to: dynamically detect a transmission link between the AS and the core network gateway; and determine a transmission bandwidth and a latency change of the transmission link based on a dynamic detection result of the transmission link.

In some embodiments of this application, based on the above solution, the detection unit 904 is configured to: determine the network transmission characteristic between the AS and the core network gateway based on an SLA between the AS and a core network.

In some embodiments of this application, based on the above solution, the detection unit 904 is configured to: evaluate whether the SLA has impact on the latency variation distribution characteristic of the service data packet based on the SLA between the AS and the core network; and determine the network transmission characteristic between the AS and the core network gateway based on the SLA between the AS and the core network if the SLA has impact on the latency variation distribution characteristic of the service data packet.

In some embodiments of this application, based on the above solution, the detection unit 904 is configured to dynamically detect a transmission link between the AS and the core network gateway based on an SLA between the AS and a core network, to obtain a transmission bandwidth and a latency change of the transmission link.

In some embodiments of this application, based on the above solution, the adjustment unit 906 is configured to: obtain a rule of impact of the network transmission characteristic on the latency variation distribution characteristic of the service data packet; and adjust the latency variation distribution characteristic of the service data packet based on the impact rule.

In some embodiments of this application, based on the above solution, that the adjustment unit 906, based on the obtained impact rule, adjusts the latency variation distribution characteristic of the service data packet by performing at least one of: increasing a set value for a value of the latency variation distribution characteristic of the service data packet, increasing a set order of magnitude for the value of the latency variation distribution characteristic of the service data packet, and increasing a set multiple for the value of the latency variation distribution characteristic of the service data packet.

In the technical solutions provided in some embodiments of this application, the latency variation distribution characteristic of the service data packet is adjusted based on the network transmission characteristic between the AS and the core network gateway, and the adjusted latency variation distribution characteristic is transmitted to the core network element, so that the core network element controls the data transmission based on the adjusted latency variation distribution characteristic. In this way, the impact of the network transmission characteristic between the AS and the core network gateway on the latency variation distribution characteristic of the service data packet may be taken into consideration, so that the adjusted latency variation distribution characteristic can adapt to an actual transmission process of the service data packet, which avoids a deviation in a configured data transmission control policy as a result of the impact of the network transmission characteristic, improves accuracy of scheduling the transmission of the service data packet and quality of transmitting the service data packet, and facilitates service experience.

Figure 10:
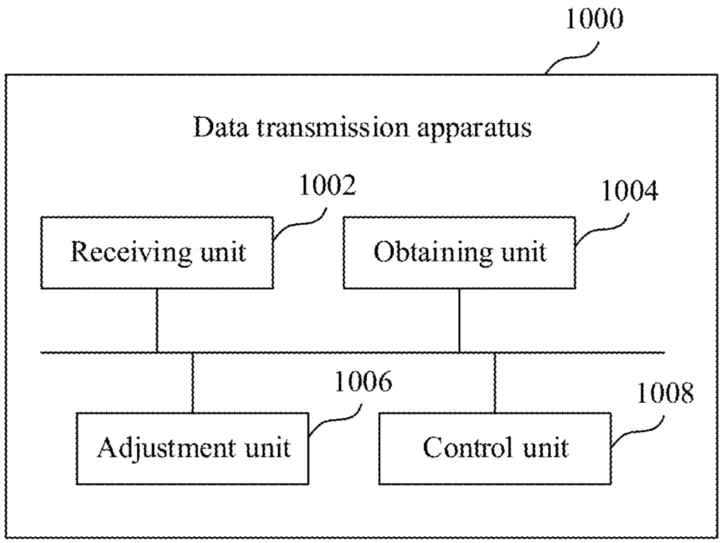
FIG. 10 is a block diagram of a data transmission apparatus according to an embodiment of this application.

FIG. 10 is a block diagram of a data transmission apparatus according to an embodiment of this application. The data transmission apparatus may be arranged in a core network element. The core network element may be a PCF.

Referring to FIG. 10, a data transmission apparatus 1000 according to an embodiment of this application includes a receiving unit 1002, an obtaining unit 1004, an adjustment unit 1006, and a control unit 1008.

The receiving unit 1002 is configured to receive an adjusted latency variation distribution characteristic for a service data packet transmitted by an AF entity, the adjusted latency variation distribution characteristic being obtained by the AF entity by adjusting a latency variation distribution characteristic of the service data packet based on a network transmission characteristic between an AS and a core network gateway. The obtaining unit 1004 is configured to obtain a network transmission characteristic between the core network gateway and an access network element. The adjustment unit 1006 is configured to readjust the latency variation distribution characteristic transmitted by the AF entity based on the network transmission characteristic between the core network gateway and the access network element. The control unit 1008 is configured to control data transmission of the access network element based on a readjusted latency variation distribution characteristic.

Figure 11:
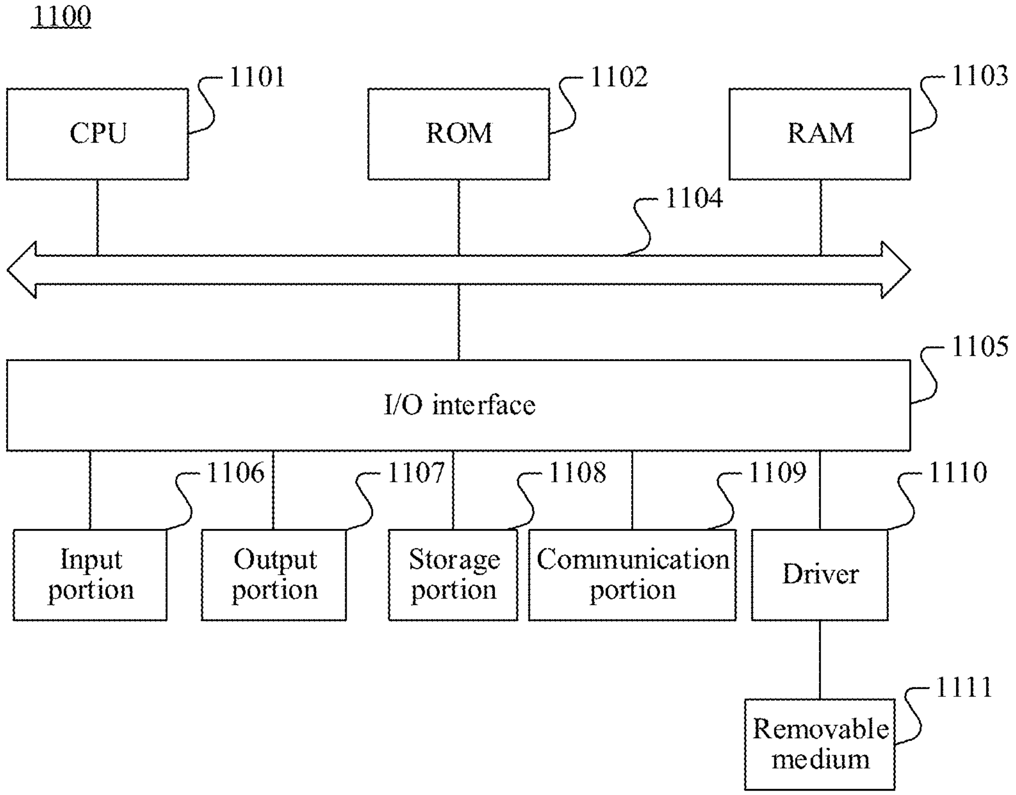
FIG. 11 is a schematic structural diagram of a computer system of an electronic device configured to implement an embodiment of this application.

FIG. 11 is a schematic structural diagram of a computer system of an electronic device configured to implement an embodiment of this application.

A computer system 1100 of an electronic device shown in FIG. 11 is merely an example, and does not impose any limitation on a function and use scope of the embodiments of this application.

As shown in FIG. 11, the computer system 1100 includes a central processing unit (CPU) 1101. The CPU may perform various appropriate actions and processing, for example, perform the method described in the above embodiments, based on a program stored in a read-only memory (ROM) 1102 or a program loaded from a storage portion 1108 into a random access memory (RAM) 1103. The RAM 1103 further has various programs and data required for system operations stored therein. The CPU 1101, the ROM 1102, and the RAM 1103 are connected to each other through a bus 1104. An input/output (I/O) interface 1105 is also connected to the bus 1104.

The following components are connected to the I/O interface 1105: an input portion 1106 including a keyboard, a mouse, and the like, an output portion 1107 including, for example, a cathode ray tube (CRT), a liquid crystal display (LCD), and a speaker, a storage portion 1108 including a hard disk and the like, and a communication potion 1109 including a network interface card such as a local area network (LAN) card and a modem. The communication portion 1109 performs communication processing by using a network such as the Internet. A driver 1110 is connected to the I/O interface 1105 as required. A removable medium 1111, such as a magnetic disk, an optical disc, a magneto-optical disk, or a semiconductor memory, is installed on the driver 1110 as required, so that a computer program read from the removable medium is installed into the storage portion 1108 as required.

In particular, according to an embodiment of this application, the above processes described with reference to the flowcharts may be implemented as computer software programs. For example, an embodiment of this application includes a computer program product, including a computer program carried in a non-transitory computer-readable storage medium. The computer program includes a computer program configured to perform the methods shown in the flowcharts. In such an embodiment, the computer program may be downloaded and installed from a network through the communication portion 1109 and/or installed from the removable medium 1111. When the computer program is executed by the CPU 1101, the various functions defined in the system of this application are executed.

The computer-readable storage medium shown in this embodiment of this application may be a computer-readable signal medium, a computer-readable storage medium, or any combination thereof. The computer-readable storage medium, for example, may be but is not limited to, an electric, magnetic, optical, electromagnetic, infrared, or semi-conductive system, apparatus, or component, or any combination thereof. More specific examples of the computer-readable storage medium may include but are not limited to an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any proper combination thereof. In this application, the computer-readable storage medium may be any tangible medium having a program included or stored therein. The program may be used by or used in combination with an instruction execution system, apparatus, or device. In this application, the computer-readable signal medium may include a data signal transmitted in a baseband or as a part of a carrier, which carries a computer-readable computer program. Such a transmitted data signal may have various forms, including but not limited to an electromagnetic signal, an optical signal, or any proper combination thereof. The computer-readable signal medium may alternatively be any computer-readable storage medium other than a computer-readable storage medium. The computer-readable storage medium may be configured to transmit or propagate a program used by or used in conjunction with an instruction execution system, apparatus, or device. The computer program included in the computer-readable storage medium may be transmitted by using any suitable medium, including but not limited to a wireless medium, a wired medium, or any proper combination thereof.

The flowcharts and the block diagrams in the drawings illustrate possible system architectures, functions, and operations that may be implemented by the system, the method, and the computer program product in the embodiments of this application. Each block in the flowcharts or the block diagrams may represent a module, a program segment, or a part of code. The module, the program segment, or the part of the code includes one or more executable instructions configured for implementing a specified logical function. In some alternative implementations, functions noted in the blocks may also occur out of the order noted in the drawings. For example, depending on functions involved, two blocks shown in succession may actually be executed substantially in parallel, or may sometimes be executed in reverse order. Each block of the block diagrams or the flowcharts and combinations of blocks in the block diagrams or the flowcharts may be implemented by a dedicated hardware-based system configured to perform specified functions or operations, or may be implemented by a combination of dedicated hardware and a computer program.

The involved units described in the embodiments of this application may be implemented by software or hardware, and the described units may alternatively be arranged in a processor. Names of the units do not constitute a limitation on the units in a specific case.

In another aspect, this application further provides a computer-readable storage medium. The computer readable medium may be included in the electronic device described in the above embodiments, or may exist alone without being installed into the electronic device. The computer-readable storage medium has one or more computer programs carried therein. The one or more computer programs, when executed by the electronic device, cause the electronic device to implement the methods described in the above embodiments.

Although a plurality of modules or units of a device configured to perform actions are discussed in the above detailed description, such division is not mandatory. In fact, based on the implementations of this application, the features and functions of the two or more modules or units described above may be embodied by one module or unit. On the contrary, the features and functions of one module or unit described above may be further divided to be embodied by a plurality of modules or units.

A person skilled in the art may clearly learn from the above descriptions of the implementations that the exemplary implementations described herein may be implemented by software, or may be implemented by software in combination with necessary hardware. Therefore, the technical solutions of the implementations of this application may be embodied in a form of a software product. The software product may be stored in a non-volatile storage medium (which may be a CD-ROM, a USB flash drive, a removable hard disk, or the like) or on the network, including a plurality of instructions configured for causing a computing device (which may be a personal computer, a server, a touch terminal, a network device, or the like) to perform the methods in the implementations of this application.

A person skilled in the art can easily figure out other implementations of this application after considering the specification and practicing the implementations disclosed herein. This application is intended to cover any variations, usages, or adaptive changes of this application. These variations, usages, or adaptive changes follow the general principles of this application and include common general knowledge or common technical means in the art not disclosed in this application.

This application is not limited to the precise structures described above and shown in the drawings, and various modifications and changes may be made without departing from the scope of this application. The scope of this application is limited only by the appended claims.

What is claimed is:

1. A data transmission method performed by an electronic device, the method comprising:

obtaining a latency variation distribution characteristic of a service data packet, the latency variation distribution characteristic comprises a maximum latency variation value and a minimum latency variation value indicating a transmission latency range of the service data packet, further including:

obtaining a network transmission status of the service data packet through statistics collection; and determining the maximum latency variation value and the minimum latency variation value based on the network transmission status of the service data packet;

detecting a network transmission characteristic between an application server (AS) and a core network gateway;

obtaining a rule of impact of the network transmission characteristic on the latency variation distribution characteristic of the service data packet using a machine learning approach through continuous detection of impact of the network transmission characteristic between the core network gateway and the AS on the latency variation distribution characteristic; and adjusting the latency variation distribution characteristic of the service data packet based on the network transmission characteristic based on the impact rule, to obtain an adjusted latency variation distribution characteristic; and transmitting the adjusted latency variation distribution characteristic to a core network element, wherein the core network element is configured to control data transmission based on the adjusted latency variation distribution characteristic.

2. The method according to claim 1, wherein the service data packet is a periodic service data packet; and the method further comprises:

determining periodicity information of the periodic service data packet based on at least one of the following factors: an encoding/decoding manner of the service data packet, a multimedia service flow transmission parameter corresponding to the service data packet, a push parameter of the AS for a multimedia service flow, and a pull parameter of the AS for the multimedia service flow.

3. The method according to claim 1, wherein the detecting a network transmission characteristic between an AS and a core network gateway comprises:

dynamically detecting a transmission link between the AS and the core network gateway; and determining a transmission bandwidth and a latency change of the transmission link based on a dynamic detection result of the transmission link.

4. The method according to claim 1, wherein the detecting a network transmission characteristic between an AS and a core network gateway comprises:

determining the network transmission characteristic between the AS and the core network gateway based on a service level agreement (SLA) between the AS and a core network.

5. The method according to claim 1, wherein the detecting a network transmission characteristic between an AS and a core network gateway comprises:

dynamically detecting a transmission link between the AS and the core network gateway based on an SLA between the AS and a core network, to obtain a transmission bandwidth and a latency change of the transmission link.

6. An electronic device, comprising:

one or more processors; and a memory, configured to store one or more computer programs, the one or more computer programs, when executed by the one or more processors, causing the electronic device to implement a data transmission method including:

obtaining a latency variation distribution characteristic of a service data packet, the latency variation distribution characteristic comprises a maximum latency variation value and a minimum latency variation value indicating a transmission latency range of the service data packet, further including:

obtaining a network transmission status of the service data packet through statistics collection; and determining the maximum latency variation value and the minimum latency variation value based on the network transmission status of the service data packet;

detecting a network transmission characteristic between an application server (AS) and a core network gateway;

obtaining a rule of impact of the network transmission characteristic on the latency variation distribution characteristic of the service data packet using a machine learning approach through continuous detection of impact of the network transmission characteristic between the core network gateway and the AS on the latency variation distribution characteristic; and adjusting the latency variation distribution characteristic of the service data packet based on the network transmission characteristic based on the impact rule, to obtain an adjusted latency variation distribution characteristic; and transmitting the adjusted latency variation distribution characteristic to a core network element, wherein the core network element is configured to control data transmission based on the adjusted latency variation distribution characteristic.

7. The electronic device according to claim 6, wherein the service data packet is a periodic service data packet; and the method further comprises:

determining periodicity information of the periodic service data packet based on at least one of the following factors: an encoding/decoding manner of the service data packet, a multimedia service flow transmission parameter corresponding to the service data packet, a push parameter of the AS for a multimedia service flow, and a pull parameter of the AS for the multimedia service flow.

8. The electronic device according to claim 6, wherein the detecting a network transmission characteristic between an AS and a core network gateway comprises:

dynamically detecting a transmission link between the AS and the core network gateway; and determining a transmission bandwidth and a latency change of the transmission link based on a dynamic detection result of the transmission link.

9. The electronic device according to claim 6, wherein the detecting a network transmission characteristic between an AS and a core network gateway comprises:

determining the network transmission characteristic between the AS and the core network gateway based on a service level agreement (SLA) between the AS and a core network.

10. The data electronic device according to claim 6, wherein the detecting a network transmission characteristic between an AS and a core network gateway comprises:

dynamically detecting a transmission link between the AS and the core network gateway based on an SLA between the AS and a core network, to obtain a transmission bandwidth and a latency change of the transmission link.

11. A non-transitory computer-readable storage medium, having a computer program stored therein, the computer program, when executed by a processor of an electronic device, causing the electronic device to perform a data transmission method including:

obtaining a latency variation distribution characteristic of a service data packet, the latency variation distribution characteristic comprises a maximum latency variation value and a minimum latency variation value indicating a transmission latency range of the service data packet, further including:

obtaining a network transmission status of the service data packet through statistics collection; and determining the maximum latency variation value and the minimum latency variation value based on the network transmission status of the service data packet;

detecting a network transmission characteristic between an application server (AS) and a core network gateway;

obtaining a rule of impact of the network transmission characteristic on the latency variation distribution characteristic of the service data packet using a machine learning approach through continuous detection of impact of the network transmission characteristic between the core network gateway and the AS on the latency variation distribution characteristic; and adjusting the latency variation distribution characteristic of the service data packet based on the network transmission characteristic based on the impact rule, to obtain an adjusted latency variation distribution characteristic; and transmitting the adjusted latency variation distribution characteristic to a core network element, wherein the core network element is configured to control data transmission based on the adjusted latency variation distribution characteristic.

12. The non-transitory computer-readable storage medium according to claim 11, wherein the service data packet is a periodic service data packet; and the method further comprises:

determining periodicity information of the periodic service data packet based on at least one of the following factors: an encoding/decoding manner of the service data packet, a multimedia service flow transmission parameter corresponding to the service data packet, a push parameter of the AS for a multimedia service flow, and a pull parameter of the AS for the multimedia service flow.

13. The non-transitory computer-readable storage medium according to claim 11, wherein the detecting a network transmission characteristic between an AS and a core network gateway comprises:

dynamically detecting a transmission link between the AS and the core network gateway; and determining a transmission bandwidth and a latency change of the transmission link based on a dynamic detection result of the transmission link.

14. The non-transitory computer-readable storage medium according to claim 11, wherein the detecting a network transmission characteristic between an AS and a core network gateway comprises:

determining the network transmission characteristic between the AS and the core network gateway based on a service level agreement (SLA) between the AS and a core network.

15. The non-transitory computer-readable storage medium according to claim 11, wherein the detecting a network transmission characteristic between an AS and a core network gateway comprises:

dynamically detecting a transmission link between the AS and the core network gateway based on an SLA between the AS and a core network, to obtain a transmission bandwidth and a latency change of the transmission link.

* * * * *